No. 797,969. PATENTED AUG. 22, 1905.
M. H. MATTY.
CENTRIFUGAL LIQUID SEPARATOR.
APPLICATION FILED JUNE 23, 1905.
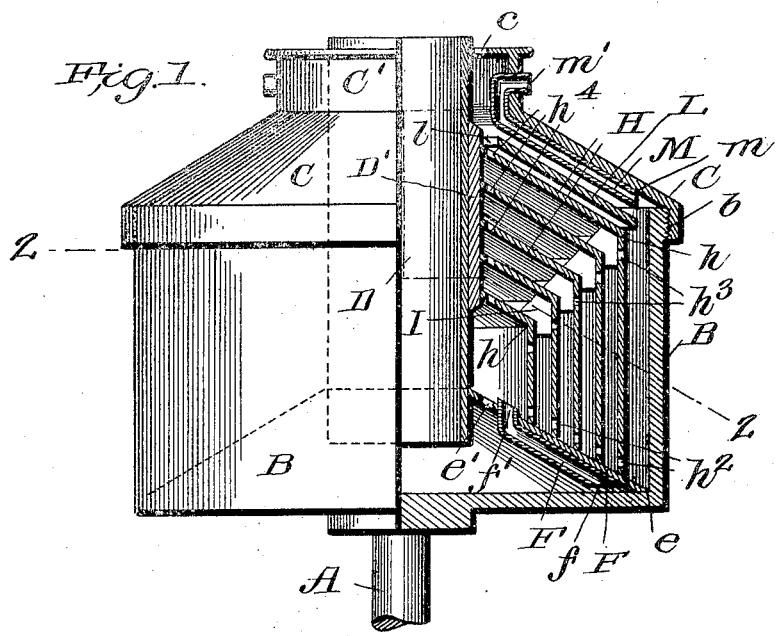
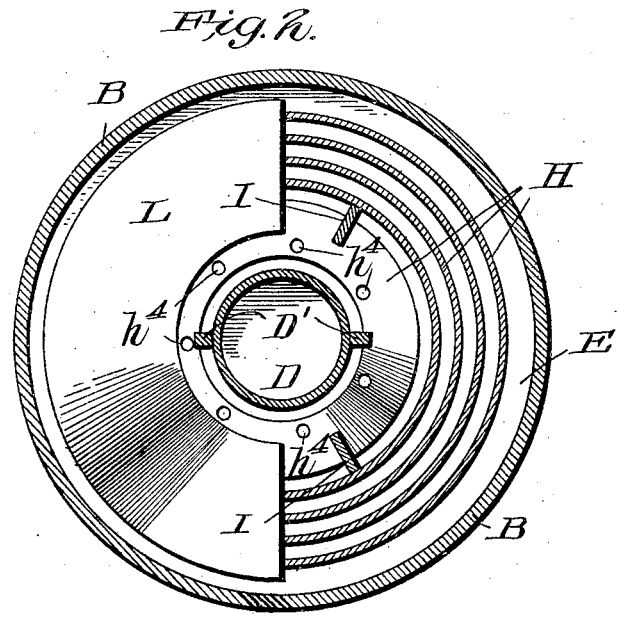
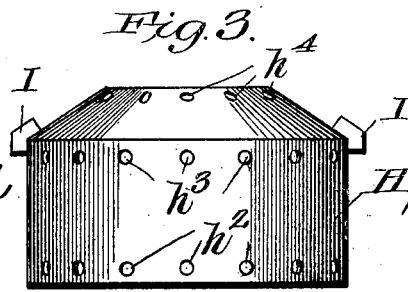
Witnesses  Inventor
M. H. Matty,
Attorneys

UNITED STATES PATENT OFFICE.

MARVIN HENRY MATTY, OF CLAYTON, NEW YORK, ASSIGNOR OF ONE-HALF TO MORTON DECKER, OF CHICAGO, ILLINOIS.

CENTRIFUGAL LIQUID-SEPARATOR.

No. 797,969.     Specification of Letters Patent.     Patented Aug. 22, 1905.

Application filed June 23, 1905. Serial No. 266,658.

*To all whom it may concern:*

Be it known that I, MARVIN HENRY MATTY, a citizen of the United States, residing at Clayton, in the county of Jefferson and State of New York, have invented certain new and useful Improvements in Centrifugal Liquid-Separators; and I do hereby declare the following to be a full, clear, and exact description of the invention, such as will enable others skilled in the art to which it appertains to make and use the same.

My invention relates to improvements in centrifugal liquid-separators more especially intended for the separation of cream from milk; and it consists of certain novel features that will be hereinafter described and claimed.

Reference is had to the accompanying drawings, in which the same parts are indicated by the same letters throughout the several views.

Figure 1 is a front elevation, partly in central vertical section, of my improved separator. Fig. 2 shows a plan view along the broken line 2 2 of Fig. 1, and Fig. 3 is a side elevation of one of the partition members removed from the separator.

A represents the spindle, which may be driven in any suitable way.

B represents the bowl, which is fast to the spindle and is provided with a screw-cap C, screwed on, as at $b$, and having one or more openings $c$ in its neck for the escape of the cream.

D represents the central or feed tube in which the whole milk is poured. This tube carries, preferably secured thereto, a plate E in the form of a truncated cone, which fits snugly against the bottom of the bowl, as at $e$, and is provided with openings $e'$ near the feed-tube D. A plurality of tubes F are carried by this plate E and have their bottom ends $f$ opening slightly above the inner bottom of the bowl and their outer ends $f'$ opening upward through the plate E. Just above this plate E are a series of partition members H, which are notched to slide over the ribs D', fast to the tube D. These partition members are open at the bottom and rest on the conical plate E and are cylindrical up to the angle $h$ and terminate in truncated hollow cones, which slip over the feed-tube D, as already described. These partition members are perforated, as at $h^2$, $h^3$, and $h^4$. (See Fig. 1.) These partition members are spaced by suitable spacers I, which may be made of bits of tin or other metal soldered or otherwise secured to the partition members, as shown in Fig. 3. Above the series of partition members is a top plate L, which is spaced from the upper partition member, as shown in Fig. 1, and has openings $l$ at its top to permit the passage upward of the separated cream.

Curved pipes M are secured to the cap C and have inlets $m$ for the skim-milk and outlets $m'$ to deliver same outward into any suitable receptacle.

In the drawings the spacing between the partition members is exaggerated for the sake of clearness.

The operation of the device is as follows: The whole milk is poured into the central tube D and is thrown outward centrifugally, part of the cream and some of the milk with it rising through the opening $e'$. The rest of the milk passes up through the tubes F to the inside of the inner partition member H, whence it is distributed through the several passages $h^2$, $h^3$, and $h^4$ to the annular chamber inside of the next outer partition member, and so on. As the milk passes through these several passages the heavier skim-milk is thrown outward and downward, while the lighter cream is gradually separated and gathers near the axis of the machine until the separated cream passes off through the opening $c$ and the heavier skim-milk is thrown out through the outlets $m'$.

It will be seen that the parts may be very readily assembled and separated for cleaning, repairs, &c. Thus the central tube D, carrying the plate E and tubes F, is set down in the bowl B. The partition members H are then put in place, then the top plate L, and finally the cap C is screwed on. To take the machine apart, reverse the operation.

Having thus described my invention, what I claim, and desire to secure by Letters Patent of the United States, is—

1. In a centrifugal liquid-separator, the combination with a bowl having a cylindrical bottom portion, a conical cap screwed thereon, the said cap being provided with an opening in the top thereof for the cream, of a tube for the whole milk mounted in the center of said bowl and terminating in an enlarged conical portion, carrying tubes for the passage of liquid, and setting down firmly on the bottom of said bowl, a series of cylindro-conical partition members mounted in said bowl above said conical portion and resting thereon, said members being provided with vertical openings near the central tube and horizontal openings in their peripheries and a plurality of pipes leading from the interior of said bowl near the outer periphery of the outer partition member and opening outward through the upper portion of said cap, substantially as described.

2. In a centrifugal liquid-separator, the combination with a bowl having a cylindrical bottom portion, a conical cap screwed thereon, the said cap being provided with a cylindrical neck, with an opening in the top thereof for the cream, of a tube for the whole milk mounted in the center of said bowl and terminating in an enlarged conical portion, carrying tubes for the passage of liquid, and setting firmly down on the bottom of said bowl, a series of partition members, having conical top portions and cylindrical bottom portions mounted in said bowl, above said conical portion and resting thereon, said partition members being provided with vertical openings near the central tube and horizontal openings at their peripheries, spacers secured to said partition members at the angle between their conical and cylindrical portions, and a plurality of bent pipes leading from the interior of said bowl near the outer periphery of the outer partition member and opening outward through the neck of said cap, substantially as described.

3. In a centrifugal liquid-separator, the combination with a bowl having a cylindrical bottom portion, a conical cap screwed thereon, the said cap being provided with a cylindrical neck, with an opening in the top thereof for the cream, of a tube for the whole milk mounted in the center of said bowl and terminating in an enlarged conical portion, carrying tubes for the passage of liquid and setting firmly down on the bottom of said bowl, a series of partition members, having conical top portions and cylindrical bottom portions mounted in said bowl above said conical portion and resting thereon, said partition members being provided with vertical openings near the central tube and horizontal openings at their peripheries, and a plurality of bent pipes leading from the interior of said bowl near the outer periphery of the outer partition member and opening outward through the neck of said cap, said partition members forming vertical passages for the liquid or passages at right angles to the lines of centrifugal force during a large portion of the process of separation, substantially as described.

4. In a centrifugal liquid-separator, the combination with a bowl having a cylindrical bottom portion, a conical cap screwed thereon, the said cap being provided with an opening in the top thereof for the cream, of a tube for the whole milk mounted in the center of said bowl and terminating in an enlarged conical portion, and setting firmly down on the bottom of said bowl, tubes carried beneath said conical portion and opening upward therethrough, a series of cylindroconical partition members mounted in said bowl above said conical portion and resting thereon, said members being provided with vertical openings near the central tube and horizontal openings in their peripheries, a conical plate perforated near its center mounted above and spaced from the upper partition member, and a plurality of pipes leading from the interior of said bowl near the outer periphery of said conical plate and opening outward through the upper portion of said cap, substantially as described.

5. In a centrifugal liquid-separator, the combination with a bowl having a cylindrical bottom portion, a conical cap screwed thereon, the said cap being provided with a cylindrical neck, with an opening in the top thereof for the cream, of a tube for the whole milk mounted in the center of said bowl and terminating in an enlarged conical portion, and setting firmly down on the bottom of said bowl, tubes carried beneath said conical portion and opening upward therethrough, a series of partition members, having conical top portions and cylindrical bottom portions mounted in said bowl, above said conical portion and resting thereon, said partition members being provided with vertical openings near the central tube and horizontal openings at their peripheries, a conical plate perforated near its center mounted above and spaced from the upper partition member, spacers secured to said partition members at the angle between their conical and cylindrical portions, and a plurality of bent pipes leading from the interior of said bowl near the outer periphery of said conical plate and opening outward through the neck of said cap, substantially as described.

6. In a centrifugal liquid-separator, the combination with a bowl having a cylindrical bottom portion, a conical cap screwed thereon, the said cap being provided with an opening in the top thereof for the cream, of a tube for the whole milk provided with vertical ribs and mounted in the center of said bowl and terminating in an enlarged conical portion, and setting firmly down on the bottom of said bowl, bent tubes secured on the under side of said conical portion and opening upward therethrough, a series of cylindroconical partition members mounted in said bowl above said conical portion and resting thereon, said members being provided with notches engaging said ribs, and with vertical openings near the central tube and horizontal openings in their peripheries and a plurality of pipes leading from the interior of said bowl near the outer periphery of the outer partition member and opening outward through the upper portion of said cap, substantially as described.

7. In a centrifugal liquid-separator, the combination with a bowl having a cylindrical bottom portion, a conical cap screwed thereon, the said cap being provided with a cylindrical neck, with an opening in the top thereof for the cream, of a tube for the whole milk provided with vertical ribs and mounted in the center of said bowl and terminating in an enlarged conical portion, and setting firmly down on the bottom of said bowl, bent tubes secured on the under side of said conical portion and opening upward therethrough, a series of partition members, having conical top portions and cylindrical bottom portions mounted in said bowl, above said conical portion and resting thereon, said partition members being provided with notches engaging said ribs, and with vertical openings near the central tube and horizontal openings at their peripheries, spacers secured to said partition members at the angle between their conical and cylindrical portions, and a plurality of bent pipes leading from the interior of said bowl near the outer periphery of the outer partition member and opening outward through the neck of said cap, substantially as described.

In testimony whereof I affix my signature in presence of two witnesses.

MARVIN HENRY MATTY.

Witnesses:
  H. MOENT,
  J. R. CASSELMAN.